United States Patent [19]

Butler et al.

[11] Patent Number: 5,407,009
[45] Date of Patent: Apr. 18, 1995

[54] PROCESS AND APPARATUS FOR THE RECOVERY OF HYDROCARBONS FROM A HYDROCARBON DEPOSIT

[75] Inventors: Roger M. Butler; Igor J. Mokrys, both of Calgary, Canada

[73] Assignee: University Technologies International Inc., Calgary, Canada

[21] Appl. No.: 149,237

[22] Filed: Nov. 9, 1993

[51] Int. Cl.$^6$ ............... E21B 43/22; E21B 43/26; E21B 43/40
[52] U.S. Cl. ............... 166/266; 166/50; 166/268; 166/271; 166/305.1
[58] Field of Search ............... 166/50, 52, 266, 267, 166/268, 271, 272, 303, 305.1, 308; 299/2

[56] References Cited

U.S. PATENT DOCUMENTS

| | | | |
|---|---|---|---|
| 2,910,123 | 1/1959 | Elkins et al. | 166/271 |
| 3,823,777 | 7/1974 | Allen et al. | 166/266 |
| 3,837,399 | 9/1974 | Allen et al. | 166/266 |
| 4,067,391 | 1/1978 | Dewell | 166/50 X |
| 4,223,728 | 9/1980 | Pegg | 166/266 |
| 4,344,485 | 8/1982 | Butler | 166/271 |
| 4,379,592 | 4/1983 | Vakhnin et al. | 299/2 |
| 4,501,326 | 2/1985 | Edmunds | 166/271 X |
| 4,598,770 | 7/1986 | Shu et al. | 166/50 X |
| 4,687,058 | 8/1987 | Casad et al. | 166/266 X |
| 5,148,869 | 9/1992 | Sanchez | 166/50 X |

OTHER PUBLICATIONS

A new process (VAPEX) for recovering heavy oils using hot water and hydrocarbon vapour, Roger M. Butler and Igor J. Mokrys, Jan.-Feb. 1991, vol. 30, No. 1, pp. 97–106.
Recovery of Heavy Oils Using Vapourized Hydrocarbon Solvents: Further Development of the Vapex Process, R. M. Butler and I. J. Mokrys, The Journal of Canadian Petroleum Technology, Jun., 1993, Vol. 32, No. 6, pp. 56–63, together with preprint thereof dated Oct. 7–9, 1991.
In-Situ Upgrading of Heavy Oils and Bitumen By Propane Deasphalting: The Vapex Process, I. J. Mokrys and R. M. Butler, U. of Calgary, Society of Petroleum Engineers, Inc., paper No. SPE 25452, Mar. 21–23, 1993, Oklahoma City, Okla., U.S.A., pp. 409–424.

(List continued on next page.)

Primary Examiner—George A. Suchfield
Attorney, Agent, or Firm—Anthony R. Lambert

[57] ABSTRACT

A method for the recovery of hydrocarbons from a hydrocarbon deposit overlying an aquifer, including injecting a hydrocarbon solvent in the vapour phase into the aquifer to mobilize hydrocarbons in the hydrocarbon deposit; and producing mobilized hydrocarbons from the hydrocarbon deposit. Mobilized hydrocarbons are produced from the aquifer, and the hydrocarbon solvent is injected along one or more predominantly horizontal injection wells in the aquifer that are spaced from and alternate with the production well or wells. The hydrocarbon solvent is a hydrocarbon solvent selected from the group consisting of ethane, propane, butane. Apparatus for the recovery of hydrocarbons from a hydrocarbon deposit overlying an aquifer, includes at least a first and preferably several injection wells drilled into the aquifer, the injection wells having a portion open to fluid communication with the aquifer; and at least a first production well and preferably several production wells drilled into one of the aquifer and the deposit, and spaced horizontally from the injection well, the first production well including a pump for pumping oil from the well. The injection wells and production wells preferably lie parallel to each other, spaced apart and alternate. A solvent recovery system is also preferably connected between adjacent injection wells and production wells. The injection and production wells preferably have a portion lying horizontally in the aquifer. The aquifer may be created by hydraulic fracturing of the base of the deposit.

23 Claims, 5 Drawing Sheets

OTHER PUBLICATIONS

Thermal Recovery of Oil and Bitumen, Roger M. Butler, Copyright 1991, Prentice-Hall, Inc., Chapter 7, Steam-Assisted Gravity Drainage, pp. 285–359.

The rise of interfering solvent chambers: solvent analog model of steam-assisted gravity drainage, Igor J. Mokrys and Roger M. Butler, The Journal of Canadian Petroleum Technology, Mar. 1993, vol. 32, No. 3, pp. 26–36.

Solvent Analog Model of Steam-Assisted Gravity Drainage, R. M. Butler and Igor J. Mokrys, AOSTRA Journal of Research, vol. 5, No. 1, Winter 1989, pp. 17–32.

Further Studies of the "VAPEX" Process Using a Hele-Shaw Cell, By Swapan K. Das and Roger M. Butler, Petroleum Society of CIM, Paper No. CIM 93-50, May 9–13, 1993, Calgary, Alberta, Canada, 15 pages.

The production of conventional heavy oil reservoirs with bottom water using steam-assisted gravity drainage, S. Sugianto and R. M. Butler, The Journal of Canadian Petroleum Technology, Mar.–Apr., 1990, vol. 29, No. 2, pp. 78–86.

PROCESS AND APPARATUS FOR THE RECOVERY OF HYDROCARBONS FROM A HYDROCARBON DEPOSIT

FIELD OF THE INVENTION

This invention relates to processes and apparatus for the recovery of hydrocarbons from hydrocarbon deposits.

BACKGROUND AND SUMMARY OF THE INVENTION

Many heavy oil reservoirs in Canada, particulary in Alberta and Saskatchewan, are thin and underlain by extensive aquifers. Bottom water frequently limits the performance of primary and thermal recovery methods used in the recovery of oil. Primary production of oil is often hampered by rapid water coning, and economic recoveries are limited to about 1–5% of the original oil in place.

In the inventor's prior U.S. Pat. No. 4,344,485, there is described a thermal method for the enhanced production of heavy oils, known as steam assisted gravity drainage (SAGD). According to that method, heated fluid is injected into a deposit from an injection well drilled into the deposit and another well, thermally connected to the injection well, is used for the production of oil. However, thermal methods for the enhanced production of oil can be inefficient and uneconomical due to excessive vertical heat losses, thin pay zones, high water cuts and steam scavenging by bottom water zones.

Underlying zones of high water saturation are also common in bitumen reservoirs for example in the Peace River, Cold Lake and Athabasca formations of Alberta, Canada and in heavy oil reservoirs such as those in the Lloydminster area of Canada. Fluids injected into such reservoirs tend to migrate through the path of least resistance, i.e., via the bottom water zone, resulting in low recoveries and poor sweep efficiencies. Pilot or commercial thermal recovery operations in these reservoirs are either considered unsuitable or their location is chosen to maximize net pay thickness and to minimize bottom water thickness. As a result, until now reservoirs with an underlying aquifer have been of a lower commercial value to operators because of low productivities and high water cuts.

By contrast, the inventor has now developed a process that uses saturated hydrocarbon solvent vapour (typically ethane or propane) in conjunction with horizontal wells to mobilize and recover viscous oils and bitumens from hydrocarbon deposits in which the bottom water zone (aquifer) is used to deliver the solvent vapour to the base of the reservoir. A hydrocarbon solvent in the vapour phase is preferably injected at reservoir temperature into an aquifer underlying the deposit. The hydrocarbon solvent vapour is essentially insoluble in water, while strongly soluble in oil, with the consequence that there are no heat or material losses to the water layer. Furthermore, the water in the bottom water zone will be mobilized and underride the lighter diluted oil and assist in moving it towards the production well.

The injection of hydrocarbon vapour into bottom water reservoirs is believed to be a cost effective solution that improves chances for an economic return. What is a disadvantage for SAGD, namely bottom water, becomes an advantage for the present process using hydrocarbon vapour injection into an aquifer.

Another advantage of the present invention is that heat losses to the reservoir rock and overburden are typically negligible. This makes the process attractive for low porosity and/or thin reservoirs as well as for thicker, higher porosity reservoirs. The invention may also have application in fractured, and/or vuggy, low porosity rocks.

An aquifer at the bottom of the reservoir creates a laterally extending communication path that distributes saturated hydrocarbon vapour underneath the deposit to mobilize the oil. In the presence of an aquifer, in situ mixing of hydrocarbon solvent and oil may be further enhanced by the stirring action of water oozing through the porous sand. By injecting the saturated hydrocarbon solvent vapour below the oil sand, i.e. within the underlying aquifer, advantage is taken of both the percolation of the water that carries along the saturated vapour and of the gravity segregation of the lighter hydrocarbon which tends to form rising solvent chambers in the underbelly of the oil sand payzone thus diluting and draining the oil. The invention may also provide in-situ upgrading and demetallizing the bitumen. A high production rate may be obtained of oil that is lighter and of higher quality than the original crude oil. In addition, its refining is simpler.

As opposed to spreading solvent chambers (as for example when a liquid solvent is injected from a vertical well into a reservoir), where the oil production rate decreases when a no flow boundary has been reached, the vertical rise of solvent chambers in accordance with the present invention occurs at a constant rate. The presence of an aquifer is therefore beneficial as it promotes the formation of a continuous blanket of rising solvent vapour chambers or fingers which results in a more complete contact of hydrocarbon vapour with the oil deposits, in a faster and more steady production rate and in a higher ultimate recovery.

There is therefore provided in one aspect of the invention a method for the recovery of hydrocarbons from a hydrocarbon deposit having an aquifer at the base of the deposit, the method comprising the steps of injecting a hydrocarbon solvent in the vapour phase into the aquifer to mobilize hydrocarbons in the hydrocarbon deposit; and producing mobilized hydrocarbons from the hydrocarbon deposit.

Preferably the mobilized hydrocarbons are produced from the aquifer, and the hydrocarbon solvent is injected along one or more predominantly horizontal injection wells in the aquifer that are spaced from and alternate with the production well or wells.

The hydrocarbon solvent is preferably a hydrocarbon solvent selected from the group consisting of ethane, propane, and butane.

Preferably, a first horizontal well is drilled into the aquifer to be used for injection of the vapour, and a second horizontal well is drilled into the aquifer to be used for production of oil. After initial injection of the hydrocarbon solvent vapour into the aquifer, a communication path is established between the first horizontal well and the second horizontal well.

In another aspect of the invention, there is provided apparatus for the recovery of hydrocarbons from a hydrocarbon deposit having an aquifer at the base of the deposit, the apparatus including a source of hydrocarbon solvent vapour; at least a first and preferably several injection wells drilled into the aquifer, the injection wells having a portion open to fluid communication with the aquifer; and at least a first production well and preferably several production wells drilled into one of the aquifer and the deposit, and spaced horizontally from the injection well, the production wells each including a pump for pumping oil from the Well. The injection wells and production wells preferably lie parallel to each other, spaced apart and alternate. A solvent recovery system is also preferably connected between the injection wells and production wells. The injection and production wells preferably have a substantial portion lying horizontally in the aquifer.

The aquifer may be created by initial hydraulic fracturing of the base of the deposit, preferably by injection of water or other suitable fracturing fluid into the base of the deposit.

BRIEF DESCRIPTION OF THE DRAWINGS

There will now be described a preferred embodiment of the invention, with reference to the drawings, by way of illustration, in which like numerals denote like elements and in which.

DETAILED DESCRIPTION OF PREFERRED EMBODIMENTS

Figure 1:
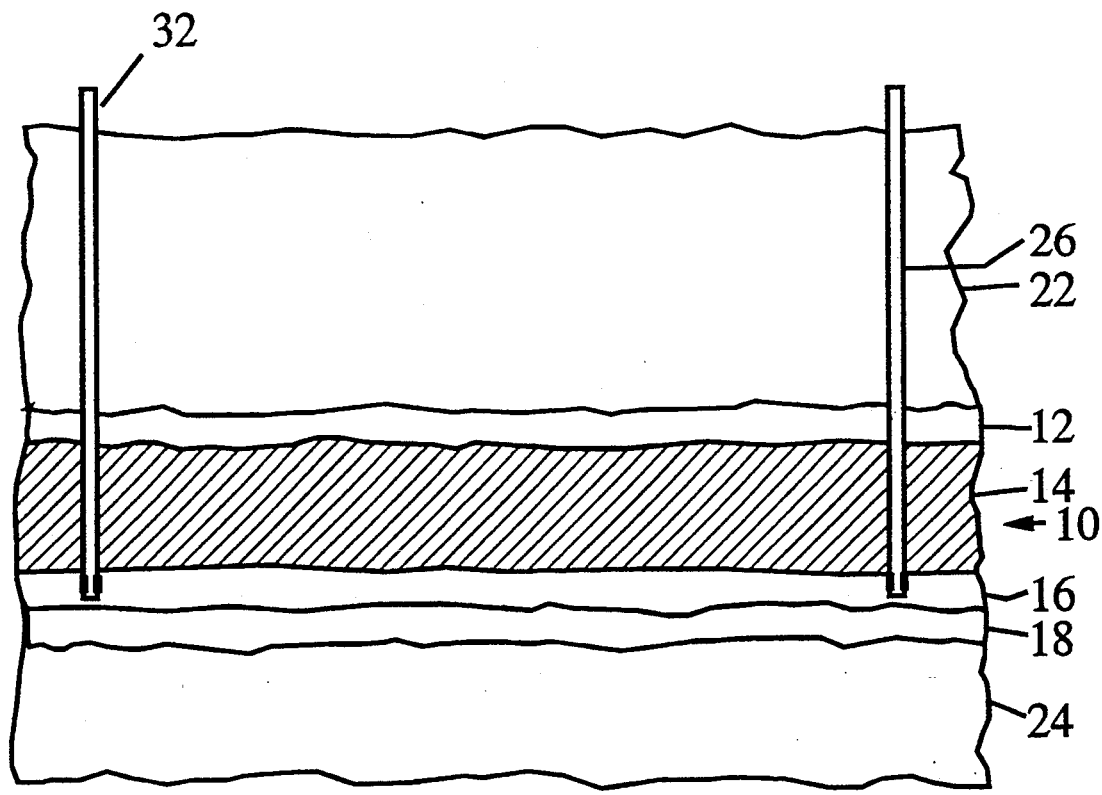
FIG. 1 is a schematic section through a hydrocarbon deposit showing the injection of a hydrocarbon solvent vapour in an aquifer underlying the deposit and the recovery of hydrocarbons from another point, in the aquifer.

A hydrocarbon deposit 10 containing high viscosity hydrocarbons such as heavy crude oil or bitumen is illustrated in FIG. 1 including a reservoir cap 12 and main reservoir 14 lying in a permeable formation or formations below the reservoir cap 12. A permeable layer forming an aquifer 16 underlies the main reservoir 14. The deposit 10 is bounded from below by a lower boundary 18. Overburden 22 above the deposit 10 is also illustrated along with underburden 24 below the deposit 10. The deposit 10 is exemplary: not all deposits will have this structure. As for example there may be no overburden, but a further hydrocarbon deposit. However, an aquifer 16 is required at the base of the deposit for the operation of the invention. The aquifer 16 may be naturally formed but the permeable layer may be created by hydraulic fracturing, as discussed below, of the formation at the base of the deposit 10. The aquifer 16 must be sufficiently permeable that injection of hydrocarbon solvent into the aquifer results in mobility of the hydrocarbon solvent an appreciable distance laterally (sufficient for production purposes) into the aquifer under the reservoir 14.

Figure 3A:
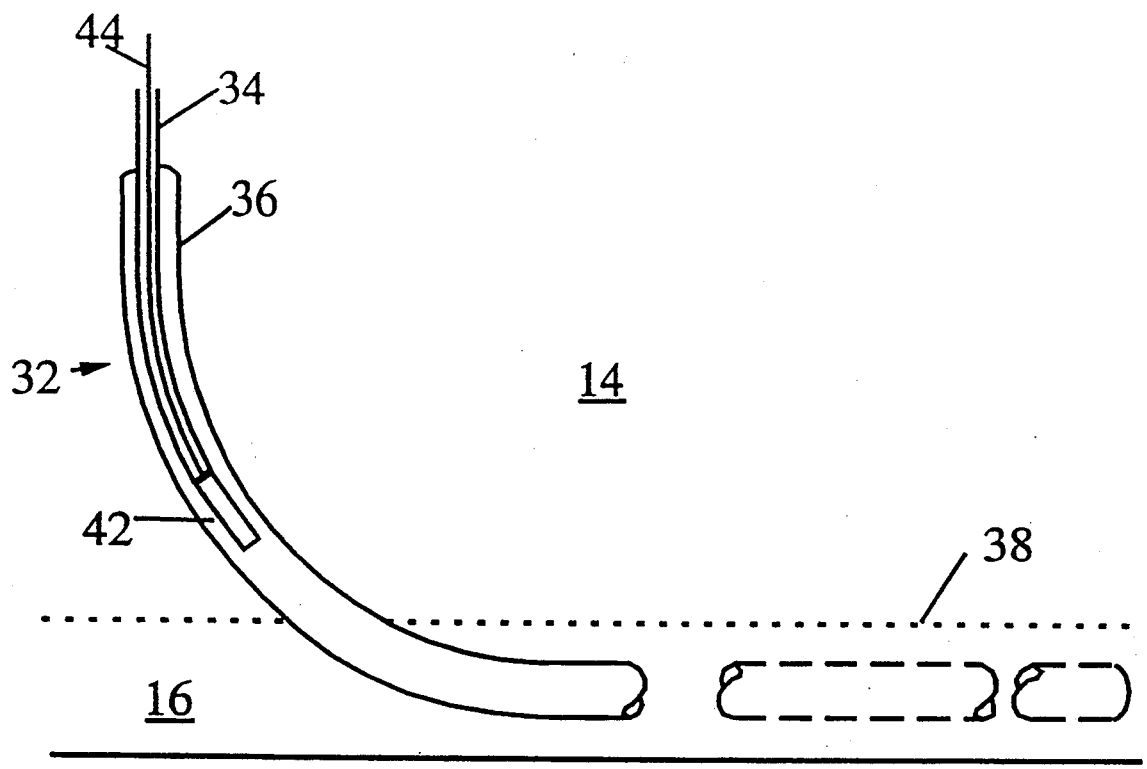
FIG. 3A is a schematic showing an exemplary horizontal production well for use in implementing the method of the invention.
Figure 3B:
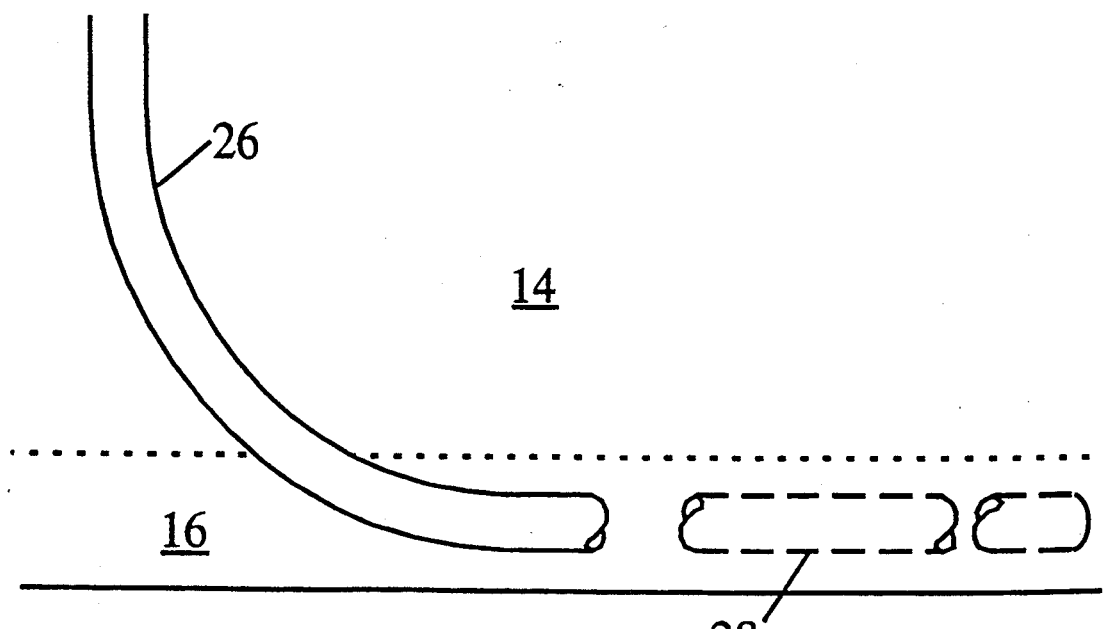
FIG. 3B is a schematic showing an exemplary horizontal injection well for use in implementing the method of the invention.

As illustrated in FIGS. 1 and 3B particularly, a horizontal injection well 26 is drilled into the deposit 10 using known techniques, preferably with a significant length of well 26 lying horizontally in the permeable layer 16. Significant or substantial in this context means 10 m or more, preferably over 100 m, for example 1 km. That part of the well 26 lying in the permeable layer 16 is open to the deposit 10 such as by perforation of the well tubing as shown at 28. The horizontal portion of the well 26 may be as long as feasible.

Figure 2:
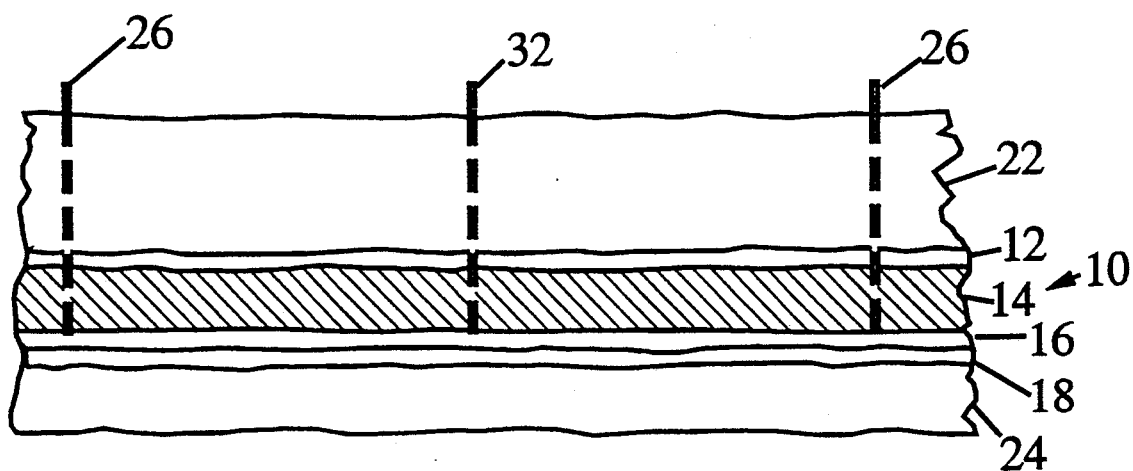
FIG. 2 is a schematic section showing an array of parallel horizontal wells in an aquifer below a hydrocarbon deposit with alternating wells used for vapour injection and hydrocarbon recovery.

A horizontal production well 32, with tubing 34 and casing 36, is also drilled using conventional techniques into the deposit 10, and extends laterally into the permeable layer 16 as illustrated particularly in FIGS. 1 and 3A. A significant length of the production well 32 lying horizontally in the permeable layer 16 is open, as for example by using a slotted liner in portion 38 of the well, to the deposit 10. A pump 42 is located in the inclined portion of the well 32. The pump 42 may be for example a conventional sucker rod reciprocating pump (as illustrated with sucker rod 44), rotary positive displacement pump, electrically driven pump, or other suitable pump. The pump 42 pumps production oil from the casing 36 up the tubing 34 to the surface where it is produced in conventional manner. As illustrated in FIG. 2, the injection wells 26 and production wells 32 are preferably spaced approximately parallel to each other and alternate with each other.

Hydrocarbon solvent is injected in the vapour phase, preferably at or just below the saturation point, into the permeable layer 16 to mobilize at least a portion of the hydrocarbons in the hydrocarbon deposit 10. The injection pressure is selected so that the hydrocarbon solvent is in the vapour phase near its saturation point. The closer to the saturation point, the higher will be the concentration of dissolved solvent in the oil which enhances mobilization of the oil and, if enough solvent is dissolved, then, particularly with propane as the solvent, also the higher the precipitation of asphaltenes. However, if too much solvent is dissolved in the reservoir, such that there are regions of essentially pure solvent, then mixing of liquid solvent with crude oil may cause massive precipitation of asphaltenes and plugging of the reservoir. This is avoided by analyzing the produced fluids and controlling the rate of injection of solvent vapour to maintain a target concentration of solvent in the preferred range of 2 to 65% by weight, with best results occurring in the range 15 to 50% by weight. The desired pressure of the vapour chamber for a reservoir at a temperature of 20° C. to 26° C. and solvent such as propane is in the order of 90 to 130 psig and for ethane is in the range 490 to 550 psig. Vapour pressure tables for the solvent being used, such as are well known in the art, may be used to help determine the appropriate pressure range to operate in, given the reservoir temperature. Allowance should also be made for the small rise in temperature of the reservoir, perhaps as much as 5° C., as solvent vapour dissolves in the crude oil. In practice the concentration of solvent dissolved in the crude oil and the pressure are controlled by controlling the rate of injection of the solvent into the aquifer.

Figure 5:
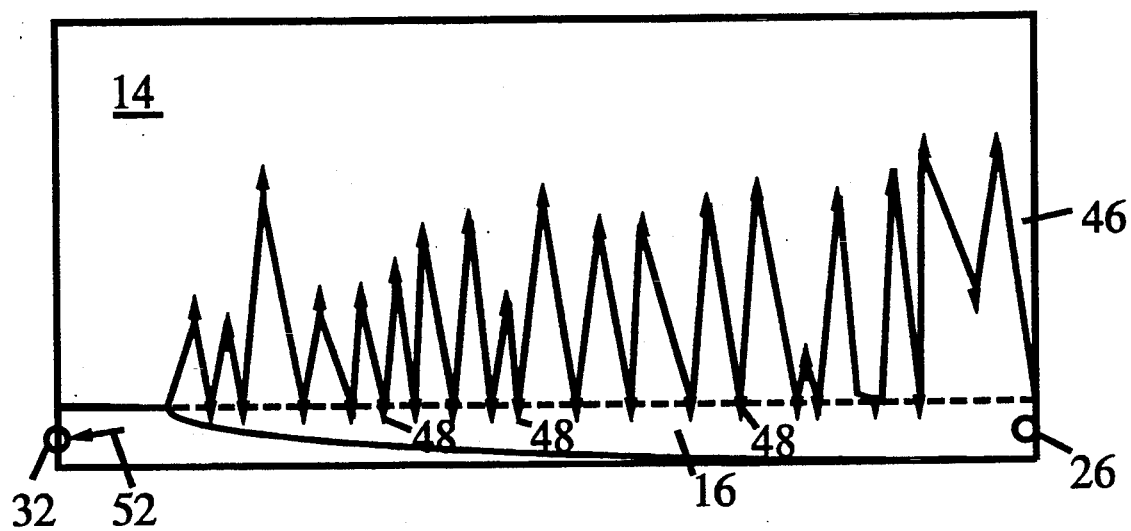
FIG. 5 is a schematic showing fingers of propane vapour rising into bitumen in a hydrocarbon deposit, with diluted deasphalted bitumen falling countercurrently so as to drain to a horizontal production well.

Upon injection of the hydrocarbon solvent into the permeable layer 16, the hydrocarbon solvent spreads across the area below the deposit 10 on either side of the horizontal injection well 26. Vapour rises, because of gravity, across this area and penetrates the overlying reservoir where it dilutes and deasphalts the oil. Asphaltenes which separate from the oil remain in the bulk of the reservoir. The vapour rises as a multitude of fingers 46 into the reservoir as illustrated in FIG. 5, mobilizing the hydrocarbon in the reservoir 14 and diluted bitumen or heavy crude oil falls countercurrently to the hydrocarbon solvent as indicated by the arrows 48. At the interface between the hydrocarbon solvent vapour and the oil, the vapour condenses into the oil, mobilizing it, and warming it up 0°–5° C.

The diluted hydrocarbon in the deposit is heavier than the vapour and flows under gravity towards the production well 32, as indicated by the arrow 52 where the mobilized hydrocarbons are produced from the hydrocarbon deposit. The interface between oil and vapour rises steadily until the supply of oil has been exhausted, near the top of the reservoir.

Figure 4:
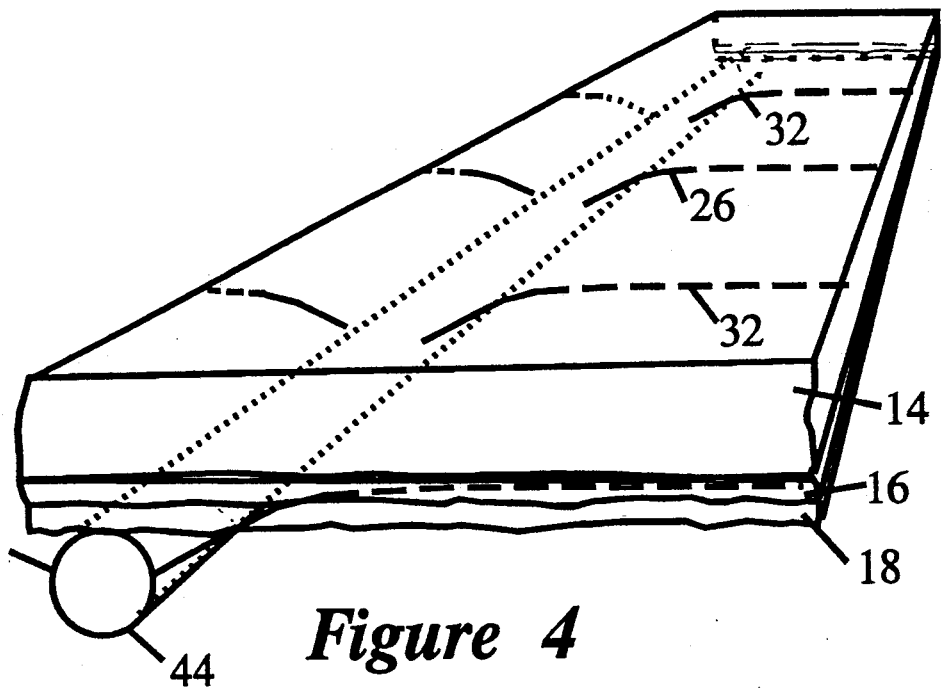
Fig. 4 is a schematic showing apparatus for implementing the method of the invention including an array of parallel wells drilled from an underground tunnel.

As illustrated in FIGS. 2 and 4, it is preferable that the hydrocarbon solvent is injected along an array of predominantly horizontal injection wells 26 spaced from each other in the aquifer and the mobilized hydrocarbons are produced along an array of horizontal production wells 32 spaced from each other in the aquifer. The wells 26 and 32 may be drilled from the surface (FIGS. 1 and 2).or from a tunnel 44 (FIG. 4). Preferably, the injection wells 26 and the production wells 32 alternate as shown in FIG. 4. It is possible that the injection well may be drilled horizontally within the reservoir 14, rather than within the aquifer but this is not preferred, as production rates are believed to be reduced. In addition, production could be obtained from vertical wells, with a vertical injection well drilled into the aquifer, or any combination of vertical and horizontal wells, so long as they are not so far apart that communication cannot be established between them. However, vertical wells are considerably less efficient than horizontal wells since an important aspect of the invention is the establishment of a solvent-oil interface that extends over a wide area.

The horizontal injection and production wells may be drilled in staggered rows, such that a row of injection wells lying more or less in line with each other is parallel to a row of production wells in line with each other, with adjacent injection wells and production wells overlapping each other. Various other arrangements of injection and production wells may be used.

If there is no pre-existing aquifer underlying the main reservoir, under some conditions, such as where fractures propagate horizontally, an aquifer may be initially created at the base of the hydrocarbon deposit by hydraulic fracturing of the rock at the base of the hydrocarbon reservoir. This technique can be used for the recovery of bitumen from shallow deposits in the following manner.

Three parallel horizontal wells, such as wells 26 and 32 shown in FIGS. 1–4, are drilled near the base of a shallow bitumen deposit such as those in Athabasca, Alberta, Canada. The depth is chosen so that an operating pressure of the order of 100 psi can be employed without disrupture of the surface. A depth greater than about 400 feet is satisfactory. The depth is also chosen so that when a hydraulic fracture is created within the reservoir, it becomes horizontal rather than vertical. It is well known to those skilled in the art that horizontal fractures form at relatively shallow depths and that there is a depth beyond which fractures tend to be vertical. The exact depth at which this transition occurs depends upon the in situ stresses in the reservoir body. Typically the depth is about 1000 feet. Thus, in this example, a depth of about 600–800 feet is chosen.

The central well of the three is used as an injector and the two flanking wells as producers. In a larger project, many such parallel wells could be employed with alternating injectors and producers.

The first stage in the process, assuming that there is no natural aquifer in the reservoir, involves the creation of a horizontal fracture extending between the injector and the two producers. This is created by injecting water or another fracturing liquid at a high pressure into the injection well. A fracture opens up and the producers, which are initially shut in, are opened when the wellbore pressure rises above the reservoir pressure. However, the wells are throttled so as to maintain a high pressure in the wellbore. During this phase, the injection of water (or other fracturing fluid) is continued.

After the flow of water has been established, a mixture of propane and a less soluble gas such as natural gas or nitrogen is forced into the injector, still maintaining a high pressure. The composition of propane in the gas is chosen so that the partial pressure within the mixture will be close to, but below the vapour pressure of propane at reservoir temperature. This flow of gas is continued until a significant volume of propane-diluted bitumen has been produced at each of the production wells. During this time, these wells are throttled so that the pressure in the fracture remains high to help keep it open.

Once sufficient bitumen has been produced to indicate that a channel has been leached above and, to a lesser extent, below the fracture in the reservoir sand, then the pressure in the production wells is reduced gradually towards the normal operating pressure; this should be slightly below the vapour pressure of propane at the reservoir temperature. As has been described previously, this reservoir temperature will tend, during the process, to rise a few degrees centigrade because of the heat of solution of the propane. As the pressure is allowed to fall in the production wells, so the pressure also falls in the injector, and the composition of the injected fluid is changed by gradually removing the injected diluent gas (eg. natural gas or nitrogen) until pure propane is injected. At this point, there is a continuous flow of propane in the plane below the reservoir and the process can proceed as described previously.

In summary, a horizontal, approximately planar fracture, is created below the reservoir by hydraulic fracturing, a mixture of a low solubility gas and propane is introduced into the fracture, sufficient bitumen is leached by the propane to create a flow passage within the matrix above the fracture, and the process described previously is continued.

By using conditions such as those described above, the pressure within the vapour chamber will be less than that in the surrounding reservoir and, as a result, there will be no tendency for the valuable vapourized solvent to escape into the reservoir. Rather, bitumen under pressure will tend to flow towards the extraction chamber, albeit very slowly.

The hydrocarbon solvent is taken from the group of light hydrocarbons, such as ethane, propane, butane or other low boiling point hydrocarbons, hydrogen sulphide, and other materials having suitable vapour pressure characteristics and solvency, as well as their mixtures. Hydrocarbon solvent in this context does not necessarily mean that the solvent is a hydrocarbon, but that the solvent is capable of dissolving hydrocarbons. However, propane and ethane and their corresponding olefins are preferred.

Figure 6:
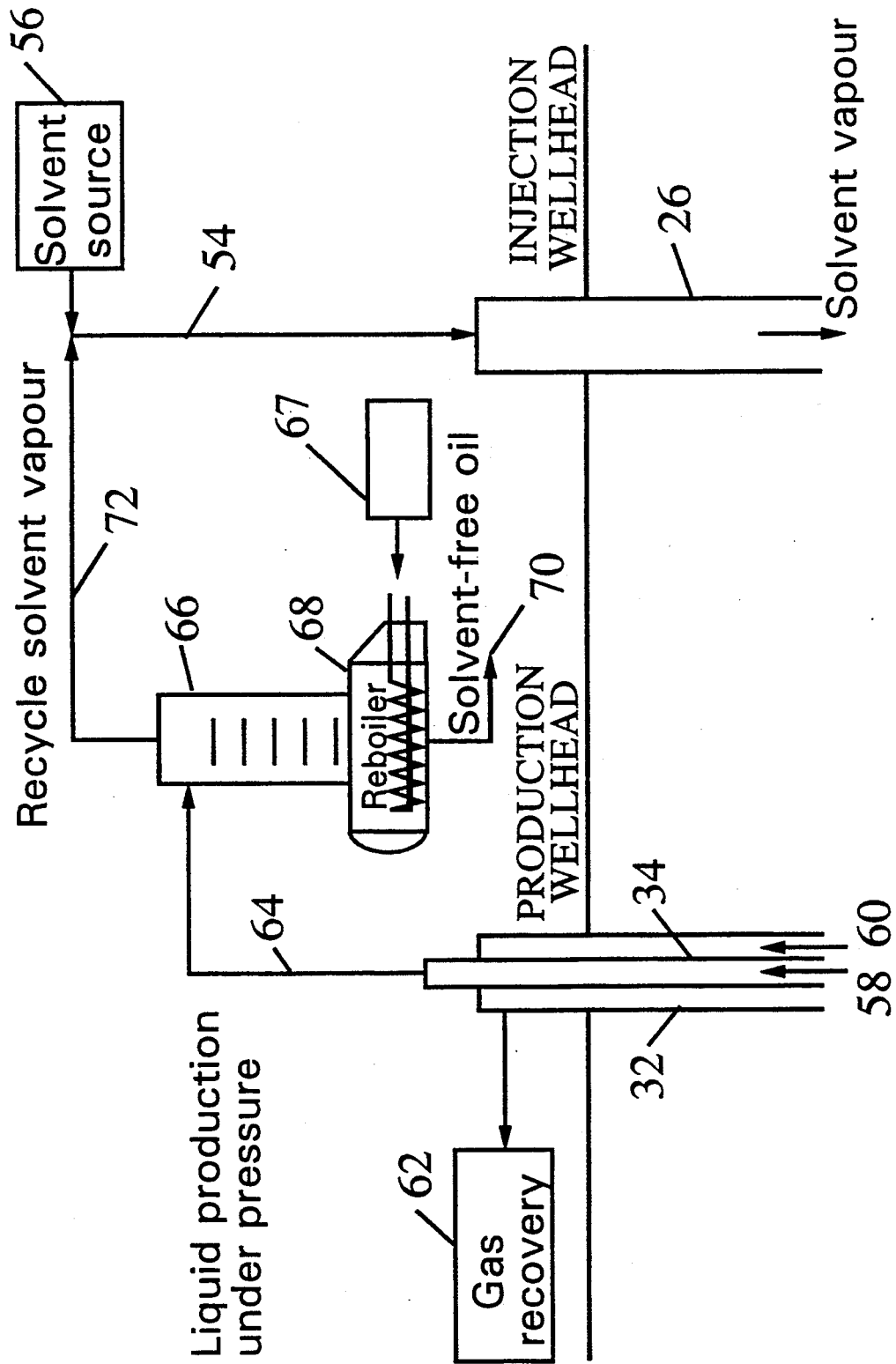
FIG. 6 is a fluid flow schematic showing a closed loop extraction process for use with the invention.

A recovery and recycling system for the hydrocarbon solvent vapour is illustrated schematically in FIG. 6. The system is composed of injection well 26, production well 32, solvent stripper 66 connected between the wells 26 and 32, a gas recovery system 62 and a make-up solvent source 56. Injection well 26 is drilled into the deposit and is fed by solvent vapour line 54 from a solvent source 56, or by recycled solvent from stripper 66 depending on the amount of solvent recycled and the injection requirements. The hydrocarbon solvent vapour is injected into the aquifer by the well 26 with pressure controlled by the pressure of solvent source 56. The pressure required to recycle the solvent vapour arises from the action of pump 42. Mobilized production oil is forced by the pump 42 of Fig.-3A through tubing 34 of the production well 32 as indicated by the arrow 58. Gas produced along with the oil flows through the annulus between the tubing 34 and casing 36 as indicated by the arrow 60 to a gas recovery system 62 of conventional design. Removal of reservoir and some chamber gas is believed desirable since it is believed to assist in keeping diluted bitumen flow channels open. If the gas is in sufficient volume, it may be desirable to separate the solvent vapour for recycling, but if not, it may be flared or used for fuel. Removal of gas from the casing preferentially removes more volatile gases such as methane and carbon dioxide. This helps maintain the purity of the hydrocarbon solvent vapour.

Liquid production under pressure from pump 42 is pumped along line 64 to solvent stripper 66. Heat from a source 67 is applied to the production liquid through reboiler 68. Oil is produced along line 70 leading from reboiler 68, and solvent vapour is returned along lines 72 and 54 from the stripper 66 for injection into the deposit through injection well 26 as required. The produced oil will be hot and heat may be recovered from the produced oil.

Models of a bitumen deposit in Canada (Peace River bitumen) and a heavy oil deposit (Lloydminster) were created to test the efficacy of the invention with propane as the solvent. From previous work by the inventor on liquid solvent recovery systems and steam assisted gravity drainage of heavy oil reservoirs, it is known that the results from the models may be extrapolated to the field.

The experimental system consisted of a cell made of reinforced phenolic resin sheets having internal dimensions of 21.7 cm inside height, 69.80 cm inside width and 3.4 to 3.5 cm inside depth. The cell volume of 5.15 l was filled with 30–50 mesh Ottawa wet sand, and represented a vertical cross-section through a reservoir pay zone with a horizontal injector and horizontal producer. In the experimental set up, a gas recycle loop and vapour make up line were included. The main element of the recycle loop was a propane stripper which heats up the propane-oil production liquid, boils off and recycles the saturated vapour and produces oil containing small amounts of solution gas. The solution gas is separated from the dead oil and collected above water in an inverted cylinder, according to known techniques. Heat for heating the propane was provided by a booster heater (for sudden increases in propane temperature as required during start up) and a smaller heater for temperature maintenance. To prepare the cell for the experiments, water was first injected into the cell and then partially displaced by oil or bitumen, such that the water had a depth of about 2.5 cm. Propane was then injected into the water layer below the bitumen.

Figure 7A:
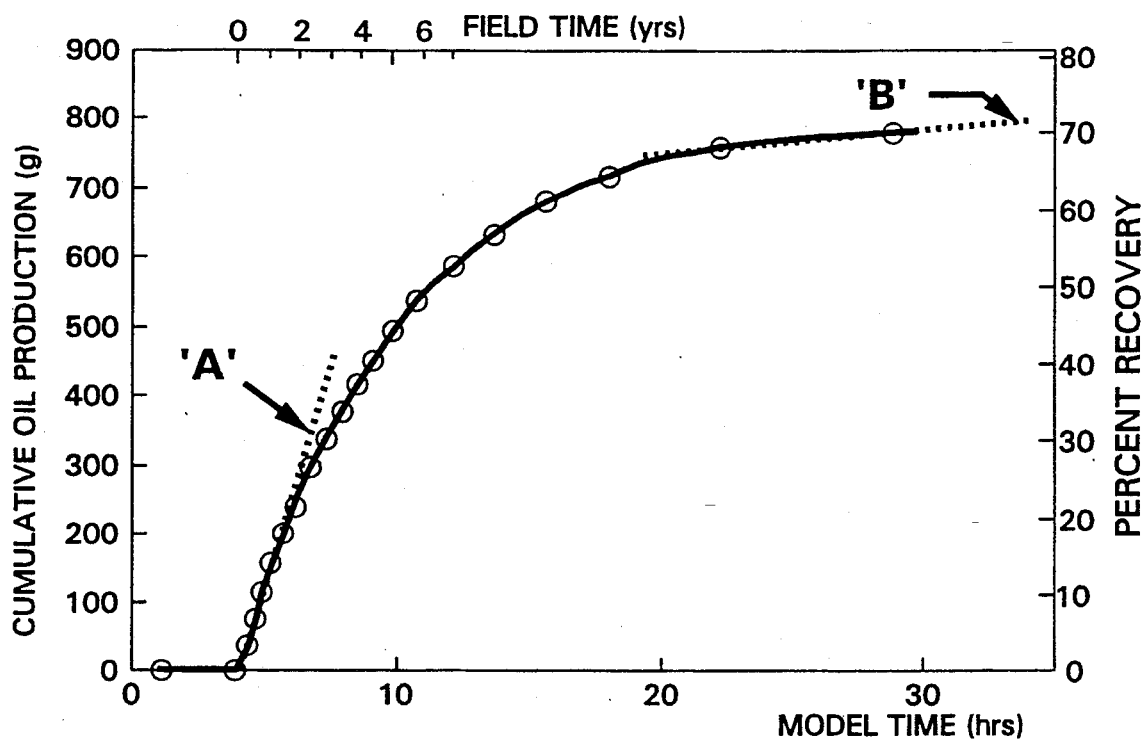
FIG. 7A is a graph showing the result of applying the method of the invention to a model of a Peace River (Canada) bitumen deposit.

FIG. 7A shows the results of operation of the invention on a model of the Peace River bitumen deposit. The wet sand had an absolute permeability of 43.5 darcy, corresponding to 0.5 darcy vertical permeability in the field, 73.1% oil saturation, 26.9% water saturation, and temperature of 22°–26.5° C. Propane was injected at a pressure of about 120 psig. The scales of FIG. 7A show cumulative production of oil in grams verses time in hours. After an initial period of slow build up of vapour pressure without production, oil production of partially deasphalted oil began at a rate of 129.1 g/hr (indicated by arrow A), corresponding to field production of 1,088 bbl/d for a 30 acre field with a 1 km production well having horizontal injector wells on either side (as in Fig. 2), dropping to 3.44 g/hr or 50 bbl/d near completion of drainage of the reservoir (indicated by arrow B), with initial viscosity at 126,000 mPa.s at 20° dropping to 1,900 mPa.s at the end of the run. The API gravity of the produced bitumen showed an increase of almost 6 degrees over its initial value of 6.3°. Total heavy metal content $(V+Ni+Fe)$ was reduced from an initial 316 ppm to 128 ppm. Total recovery was about 70%, but this included a greater percent light fractions as compared with the initial reservoir. The remaining 30% of gooey material left behind as deposits in the reservoir had a much higher concentration of undesirable asphaltenes that contain chemically bonded heavy metals than with the original crude. Water was initially produced before oil production started as oil displaced water in the aquifer. After oil break through, water production ceased. Propane injection was initially high with half of all propane consumed during the first hour as a vapour chamber was formed. An initial high vapour consumption is to be expected when an aquifer is used for injection of the vapour. Vapour injection must be at a controlled rate to prevent liquid condensation in the cell as pressurized vapour expands into the cell.

Figure 7B:
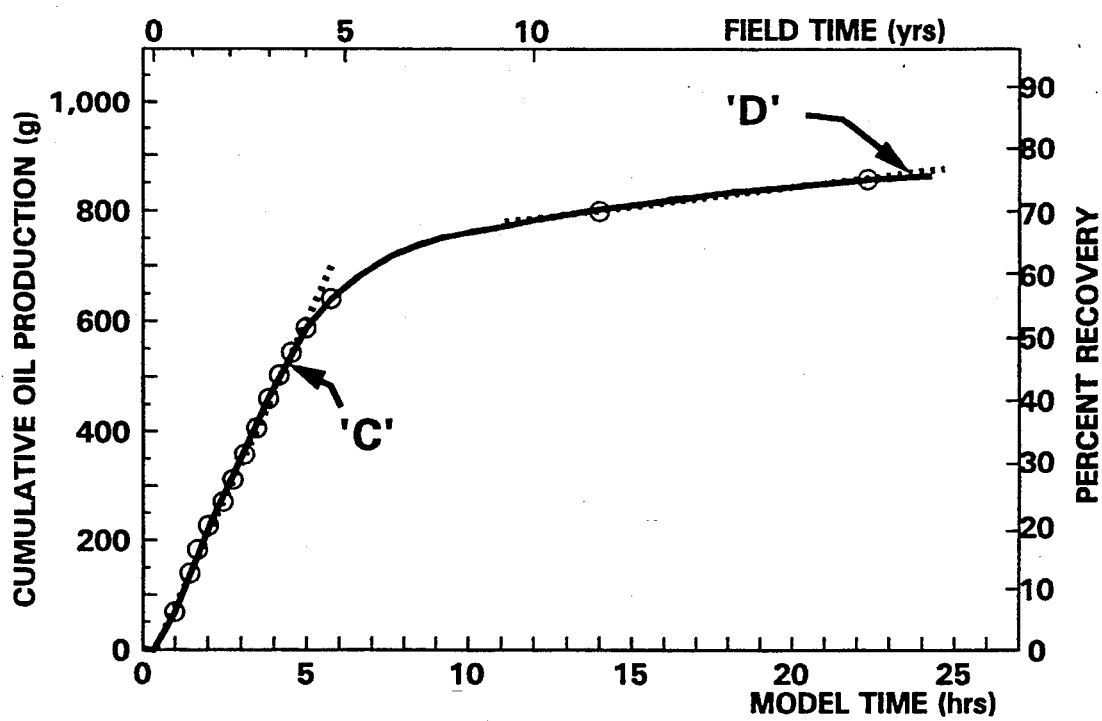
FIG. 7B is a graph showing the result of applying the method of the invention to a model of a Lloydminster (Canada) heavy oil deposit.

FIG. 7B shows results of a similar model of the application of the method of the invention to Lloydminster heavy oil. The model was the same as with the Peace River bitumen, only the oil saturation of the Lloydminster oil was 75.9% with water saturation at 24.1%. A similar production rate of partially deasphalted oil (129.1g/hr corresponding to 1,088 bbl/d) was initially seen (arrow C), falling to 90 bbl/d near complete production (arrow D), with initial viscosity of 6 Pa.s at 20° C falling to near 0.5 Pa.s at 20° C. near completion of production. The total production was 75% in 22 field years. The similar production rate for heavy oil as compared with bitumen, which in this case is 17 times more viscous, suggests that the solvent is the determining factor for the production rate, thereby indicating the particular benefit of the invention for use with bitumen.

Operation of the invention with the model of FIG. 7B together with co-injection of water with propane into the aquifer resulted in the formation of high viscosity emulsified oil which tended to negate the benefit of the reduction of viscosity due to in situ deasphalting of the oil. The viscosity of the produced oil ranged from 30 to 40,000 mPa.s with a maximum of 60,000 mPa.s, and the API gravity dropped by 1-2 degrees. Production with co-injection of water reached only 52% in 12 hours as compared with near 70% for production in 12 hours when water was not coinjected with propane. It is therefore believed that injection of dry solvent vapour is preferred.

In experiments using ethane (pressure about 500 psig), similar production rates were found, but the ethane did not deasphalt the oil as effectively as the propane. Comparable production rates were also found when butane was used as the solvent in experiments carried out in a similar but smaller apparatus.

For the efficient operation of the method of the invention, it is desirable that the solvent vapour spread along the aquifer at a rapid rate with fast pressure build up, such that the entire underbelly of the reservoir is contacted almost simultaneously. It is preferable to inject the hydrocarbon solvent vapour into the aquifer at a rate such that the solvent passage in the aquifer is kept open. As liquids are produced from the reservoir, additional propane must be added to ensure a continuous communication path between the wells. The pressure for propane should be kept in the range 90 to 130 psig. The solvent vapour, as shown in FIG. 5, rises as fingers with a more or less constant rate of rise. As the interface reaches the top of the payzone, the drainage of oil slows significantly. It is expected that high production rates can be expected until about 50-60% of the oil is produced due to the effect of the rising solvent chamber, with a sharp drop off thereafter when drainage is due primarily to gravity.

If the hydrocarbon solvent vapour is not injected into the aquifer at a sufficiently high rate, the vapour will rise into the reservoir vertically near the injection well and spread along the top of the reservoir. While this will produce hydrocarbon from the reservoir, production rates are lower since there is less interfacial area available for mass transfer.

Using Darcy's law and assuming comparable diffusivities, diffusion rates, porosity and oil saturation in the model and the field (believed to be reasonable assumptions), it can be shown that:

$$\frac{(H/t)_F}{(H/t)_M} = \frac{H_M}{H_F} = \frac{k_F}{k_M}$$

where H is the height of the reservoir pay zone, t is time, k is the permeability, and F indicates the parameter is a field parameter and M indicates model parameter. This equation ignores the effects of interfacial tension and capillary pressure. These effects can be important and tend to make rates in the field higher than those predicted. From this equation, it follows that the model described above with a payzone of 0.217 m at 43.5 darcy corresponds to an 18.9 m field payzone with 0.5 darcy vertical permeability, and 1 model hour corresponds to 0.866 field years. In addition, the distance between injector and producer, 69.8 cm in the model, corresponds to 61 m in the field, for a pattern width (distance between injectors) of 122 m. Extrapolation to the field also requires multiplication by the factor $L_F/L_M$ where $L_F$ is the length of the well in the field (assumed to be 1000 m) and $L_M$ is the length of the model well (0.035 m). The calculated rate of 1,088 bbl/d corresponds to 50% recovery in 3.98 field years and is proportional to the assumed vertical permeability and the area of drainage. The flow rate is determined largely by the solvent viscosity and diffusivity since the flow takes place largely at the interface between the solvent and oil.

Further modelling of solvent flow in an oil reservoir (though without using an aquifer) may be found in Butler et al, "A New Process (VAPEX) for Recovering Heavy Oils using Hot Water and Hydrocarbon Vapour" JCPT, Vol. 30, No. 1, pp. 97-106, Jan-Feb 1991 and Butler et al,, "Recovery of Heavy Oils Using Vapourized Hydrocarbon Solvents: Further Developments of the VAPEX Process", JCPT, Vol. 32, No. 6, pp. 56-62, June 1993.

The spacing between horizontal wells can be adjusted to achieve a drainage area with a required oil production rate. Lower solvent pressure may lower the oil production rate and therefore extend production lifetime, though with lower API gravity oil being produced. The limiting factor in the spacing of wells is believed to be pressure and volume requirement for establishing the initial communication between adjacent wells, the rapid spread of the solvent vapour and the pumping capacity for propane input and oil removal.

A person skilled in the art could make immaterial modifications to the invention described and claimed in this patent without departing from the essence of the invention.

The embodiments of the invention in which an exclusive property or privilege is claimed are defined as follows:

1. A method for the recovery of hydrocarbons from a hydrocarbon deposit having an aquifer at the base of the hydrocarbon deposit, the method comprising the steps of:
   injecting a hydrocarbon solvent in the vapour phase along a predominantly horizontal injection well into the aquifer to mobilize hydrocarbons in the hydrocarbon deposit; and
   producing mobilized hydrocarbons from the hydrocarbon deposit.

2. The method of claim 1 in which the mobilized hydrocarbons are produced from the aquifer.

3. The method of claim 1 in which the hydrocarbon solvent is injected into a pre-existing aquifer.

4. The method of claim 1 in which the mobilized hydrocarbons are produced along a predominantly horizontal production well in the aquifer.

5. The method of claim 4 in which the hydrocarbon solvent is injected along an array of predominantly horizontal injection wells spaced from each other in the aquifer and the mobilized hydrocarbons are produced along an array of horizontal production wells in the aquifer, and the production and injection wells alternate.

6. The method of claim 1 further including initially creating an aquifer at the base of the hydrocarbon deposit by:
   hydraulic fracturing of the hydrocarbon deposit to create a horizontal fracture in the hydrocarbon deposit and
   injecting water into the horizontal fracture.

7. The method of claim 1 in which the hydrocarbon solvent in the vapour phase is injected into the hydrocarbon deposit at about the hydrocarbon deposit temperature.

8. The method of claim 3 in which the hydrocarbon solvent is injected along an array of predominantly horizontal injection wells spaced from each other in the aquifer and the mobilized hydrocarbons are produced along an array of horizontal production wells in the aquifer, and the production and injection wells alternate.

9. The method of claim 1 in which the hydrocarbon solvent is selected from the group consisting of ethane, propane and butane.

10. The method of claim 1 further including injecting the hydrocarbon solvent into the aquifer along with a diluent gas that is less soluble in the hydrocarbon deposit than the hydrocarbon solvent.

11. The method of claim 1 in which the solvent vapour is dry.

12. The method of claim 1 further including producing free gas along with the mobilized hydrocarbons.

13. Apparatus for the recovery of hydrocarbons from a hydrocarbon deposit having an aquifer at the base of the hydrocarbon deposit, the apparatus comprising:
   a source of hydrocarbon solvent vapour;
   a first injection well drilled horizontally into the aquifer, the injection well having a portion open to fluid communication with the aquifer and being connected to the source of hydrocarbon solvent vapour; and
   a first production well drilled horizontally into one of the aquifer and the deposit, and spaced horizontally from the injection well, the first production well including a pump for pumping oil from the well.

14. The apparatus of claim 13 further including a solvent stripper connected between the first injection well and the first production well.

15. The apparatus of claim 13 further including a second injection well drilled into and lying horizontally in the aquifer spaced from the first production well, with the first production well located between the first and second injection wells.

16. The apparatus of claim 13 further including a gas recovery system attached to the production well.

17. A method for the production of hydrocarbons from a hydrocarbon deposit having a base, the method comprising:
   drilling a first horizontal well into the base of the hydrocarbon deposit;
   drilling a second horizontal well into the base of the hydrocarbon deposit spaced from the first horizontal well;
   fracturing the base of the hydrocarbon deposit to form horizontal fractures extending between the first horizontal well and the second horizontal well;
   injecting a saturated hydrocarbon solvent vapour into the base of the hydrocarbon deposit through the first horizontal well; and
   producing hydrocarbons from the second horizontal well.

18. The method of claim 17 in which the hydrocarbon solvent vapour is selected from the group consisting of ethane, propane and butane.

19. The method of claim 18 in which the hydrocarbon deposit is a bitumen deposit.

20. The method of claim 17 in which fracturing the base of the hydrocarbon deposit includes:
   injecting a fracturing fluid into the base of the hydrocarbon deposit from the first horizontal well.

21. The method of claim 17 in which injecting a saturated hydrocarbon solvent vapour into the base of the hydrocarbon deposit through the first horizontal well includes initially injecting a mixture of the hydrocarbon solvent vapour and a diluent gas into the base of the hydrocarbon deposit.

22. A method for the recovery of hydrocarbons from a hydrocarbon deposit having an aquifer at the base of the hydrocarbon deposit, the method comprising the steps of:
   injecting a hydrocarbon solvent in the vapour phase into the aquifer at about the hydrocarbon deposit temperature to mobilize hydrocarbons in the hydrocarbon deposit; and
   producing mobilized hydrocarbons from the hydrocarbon deposit.

23. The method of claim 22 in which the aquifer is pre-existing.

* * * * *